(12) United States Patent
Wroblewski

(10) Patent No.: US 10,429,960 B2
(45) Date of Patent: Oct. 1, 2019

(54) ADAPTABLE CONTROL-KNOB SYSTEM ON A SMARTPHONE OR ELECTRONIC TABLET

(71) Applicants: Continental Automotive France, Toulouse (FR); Continental Automotive GmbH, Hannover (DE)

(72) Inventor: Jérôme Wroblewski, Mainvilliers (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 61 days.

(21) Appl. No.: 15/760,840

(22) PCT Filed: Aug. 26, 2016

(86) PCT No.: PCT/EP2016/001442
§ 371 (c)(1),
(2) Date: Mar. 16, 2018

(87) PCT Pub. No.: WO2017/045744
PCT Pub. Date: Mar. 23, 2017

(65) Prior Publication Data
US 2018/0253162 A1 Sep. 6, 2018

(30) Foreign Application Priority Data
Sep. 17, 2015 (FR) .................................. 15 58736

(51) Int. Cl.
*G06F 3/0362* (2013.01)
*G06F 1/16* (2006.01)
(Continued)

(52) U.S. Cl.
CPC .......... *G06F 3/0362* (2013.01); *G06F 1/1626* (2013.01); *G06F 1/1632* (2013.01);
(Continued)

(58) Field of Classification Search
CPC .... G06F 3/0362; G06F 1/1686; G06F 1/1632; G06F 1/1626; H04B 1/3877;
(Continued)

(56) References Cited

U.S. PATENT DOCUMENTS 6,326,956 B1 12/2001 Jaeger et al.
2010/0214257 A1 8/2010 Wussler et al.
(Continued)

FOREIGN PATENT DOCUMENTS

WO 2012139203 A1 10/2012

OTHER PUBLICATIONS

International Search Report and Written Opinion for International Application No. PCT/EP2016/001442, dated Nov. 22, 2016, 9 pages.

*Primary Examiner* — Mark W Regn
(74) *Attorney, Agent, or Firm* — RatnerPrestia

(57) ABSTRACT

A control-knob selection system includes a smartphone or electronic tablet having a front face equipped with a display and a video camera, a support equipped with a control-knob button, and a receiving area able to receive and retain the smartphone or electronic tablet, such that when the smartphone or electronic tablet is positioned in the receiving area, an optical path between a light source emitted by the display and the video camera is selectively established or interrupted depending on the angular position of the control-knob button about the axis A, with at least one reflection on an optical reflector, whereby the control-knob function uses the smartphone resources and can operate with just one software application.

10 Claims, 3 Drawing Sheets

(51) Int. Cl.
  *H04M 1/04* (2006.01)
  *H04M 1/23* (2006.01)
  *H04B 1/3877* (2015.01)
  *H04M 1/725* (2006.01)
  *G05G 1/08* (2006.01)

(52) U.S. Cl.
  CPC ......... *G06F 1/1686* (2013.01); *H04B 1/3877* (2013.01); *H04M 1/04* (2013.01); *H04M 1/233* (2013.01); *H04M 1/72525* (2013.01); *H04M 1/72527* (2013.01); *B60K 2370/126* (2019.05); *B60K 2370/145* (2019.05); *B60K 2370/21* (2019.05); *G05G 1/08* (2013.01); *H04M 2250/52* (2013.01); *H04M 2250/74* (2013.01)

(58) Field of Classification Search
  CPC ......... H04M 1/72525; H04M 1/72527; H04M 1/233; H04M 1/04; H04M 2250/74; H04M 2250/52; B60K 2370/21; B60K 2370/126; B60K 2370/145; G05G 1/08
  See application file for complete search history.

(56) References Cited

U.S. PATENT DOCUMENTS

| | | | |
|---|---|---|---|
| 2013/0241822 A1 | 9/2013 | Sharma et al. | |
| 2016/0154479 A1* | 6/2016 | Lee | G06F 3/0362 345/173 |
| 2016/0209025 A1* | 7/2016 | Matthews | F21L 4/04 |

* cited by examiner

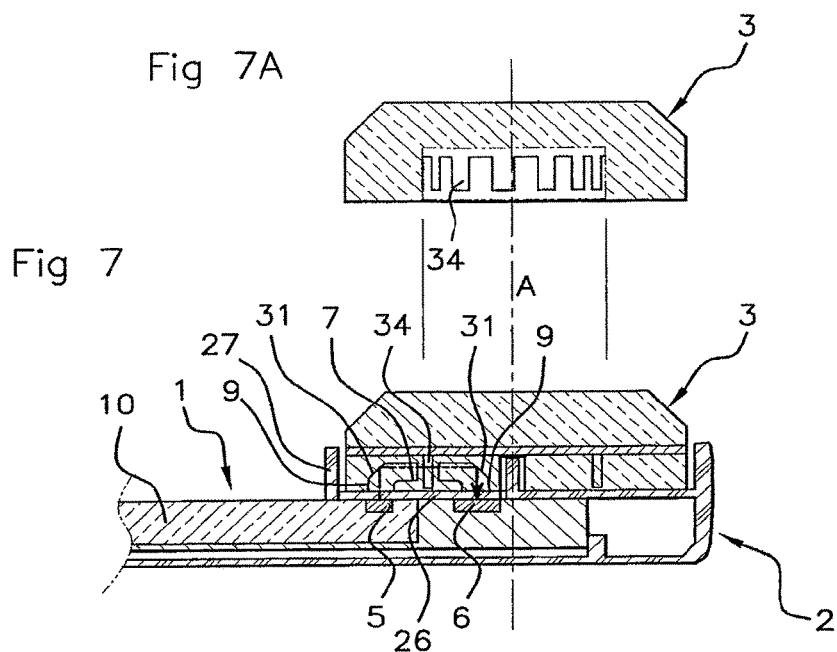
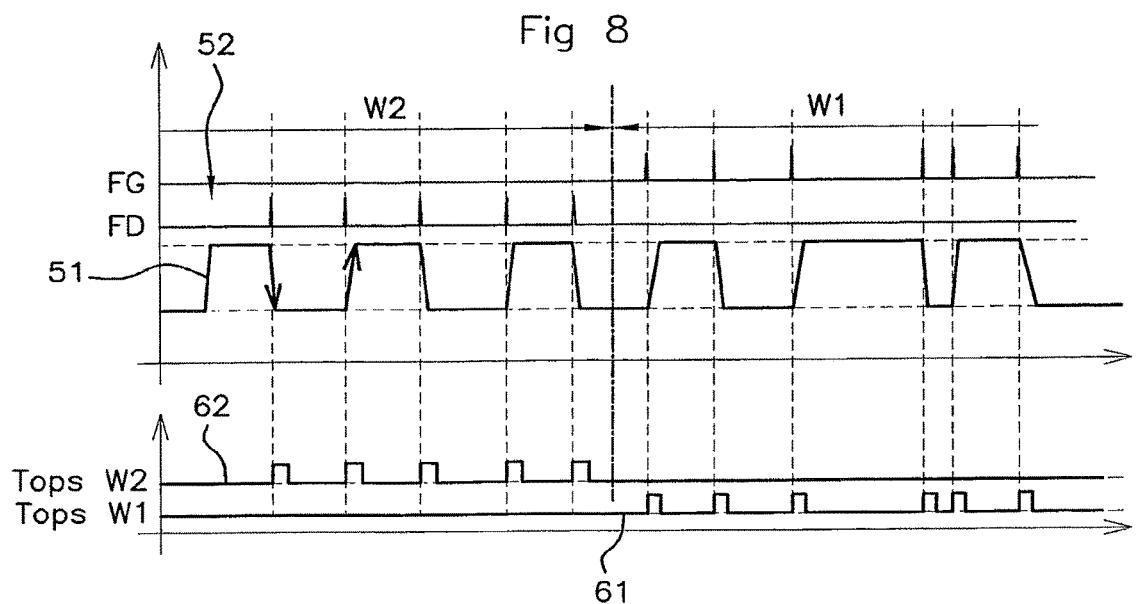
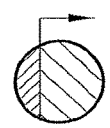
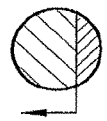

ADAPTABLE CONTROL-KNOB SYSTEM ON A SMARTPHONE OR ELECTRONIC TABLET

CROSS REFERENCE TO RELATED APPLICATIONS

This application is the U.S. National Phase Application of PCT International Application No. PCT/EP2016/001442, filed Aug. 26, 2016, which claims priority to French Patent Application No. 1558736, filed Sep. 17, 2015, the contents of such applications being incorporated by reference herein.

FIELD OF THE INVENTION

The present invention relates to rotary switches positioned on a smartphone or an electronic tablet, and it relates in particular to an adjustable control knob system on a smartphone or electronic tablet. Such a configuration is particularly advantageous when using a smartphone or an electronic tablet in a vehicle, in particular when driving.

BACKGROUND OF THE INVENTION

It is a fact that touchscreens are being used increasingly, including in human-machine interfaces ("HMIs") of motor vehicles, and traditional roaming electronic devices, such as smartphones and electronic tablets, are also being used increasingly in said vehicles, in particular, but not exclusively, for a navigation/guidance function.

It turns out, however, that using physical buttons provides an ease of use that a touchscreen is unable to offer, in particular when driving, when the user's finger(s) may tremble and are not accurate.

As a result, a need has emerged to combine the versatility of a smartphone or of an electronic tablet with the ease of use of a physical button.

One of the physical buttons whose ease of use is most appreciated by users is a rotary control knob, furthermore equipped, or not equipped, with an axial confirmation motion. Mention is also made of a "multifunctional control knob"; the technical component underlying the control knob is traditionally based on an encoder based on an optical principle or on the Hall effect, which device is not available in smartphones and electronic tablets, which are often completely touch-based.

SUMMARY OF THE INVENTION

A need has therefore emerged to propose a solution for integrating a control knob system into a smartphone or an electronic touchscreen tablet.

To this end, what is proposed here is a control knob selection system comprising:
  a smartphone or an electronic tablet with a front face equipped with a display and with a video camera,
  a carrier equipped with a control knob mounted so as to rotate about an axis A with respect to the carrier, and with a reception zone designed to receive and hold the smartphone or the electronic tablet,
  and, when the smartphone or the electronic tablet is positioned in the reception zone,
    an optical path between a light source emitted by the display and the video camera, with at least one reflection off an optical reflector, said path being able to be established or interrupted selectively depending on the angular position of the control knob about the axis A.

By virtue of these provisions, the control knob function uses the resources of the smartphone, the carrier and the control knob, and is able to operate with just one software application, without modifying the hardware of the smartphone or of the electronic tablet. The user is thus able, by rotating the control knob, to choose an element from a list or adjust a parameter, in conjunction with a corresponding display on the display.

In various embodiments of the invention, there may possibly furthermore be recourse to one and/or the other of the following provisions:
  the optical path may be selectively interrupted by virtue of a slotted cowl in the control knob; this turns out to be a particularly simple solution, with the shape of the slots being obtained by plastic molding;
  according to one implementation, the optical path is subjected to two 90° reflections, the cowl being cylindrical about an axis A and interposed selectively on the path between the two reflections; precedence is thus given to the direction normal to the plane of the screen, both for emission and for reception;
  the control knob and the carrier preferably do not have any electronic component, just an optical function, such that the entire functionality is supported by the smartphone without modifying the hardware thereof;
  the source may be a point or a bar, preferably white in color, preferably on an edge zone of the display screen that is closest to the position of the camera. The function of emitting light is thus particularly simple, and impinges on the display screen as little as possible.
  the direction of rotation is advantageously detected by virtue of video analysis of the images and of front motion detection in the images. The analytical capabilities of the camera of the smartphone are thus exploited;
  the system furthermore advantageously comprises a software application for generating the light source and the video processing of the images received by the camera;
  the software application advantageously carries out an analysis of the changes of levels and of the frequency thereof so as to determine the direction of rotation and the magnitude/speed of rotational movement of the control knob;
  the control knob may furthermore comprise notches or haptic feedback upon rotation. It is thus possible to improve the "touch" of the control knob by the user;
  the carrier may comprise a circular or partially circular wall that prevents external light from penetrating into a dark chamber in which the optical path is situated. The system is thus prevented from being contaminated by an aggressive bright atmosphere, such as the sun or neon lights or other light sources;
  the system may furthermore comprise the use of a voice command for the confirmation function following selection of an element to be confirmed by the control knob. Selection by rotation and confirmation by voice command are thus combined.

BRIEF DESCRIPTION OF THE DRAWINGS

Other aspects, aims and advantages of the invention will emerge upon reading the following description of one of its embodiments, given by way of nonlimiting example, in particular with reference to the appended drawings, in which:

FIG. 8 shows timing diagrams illustrating the operation of the device, FIGS. 9A and 9B illustrate the detection of the direction of rotation through analysis of the images captured by the camera.

DETAILED DESCRIPTION OF THE PREFERRED EMBODIMENTS

In the various figures, the same references denote identical or similar elements.

Figure 1:
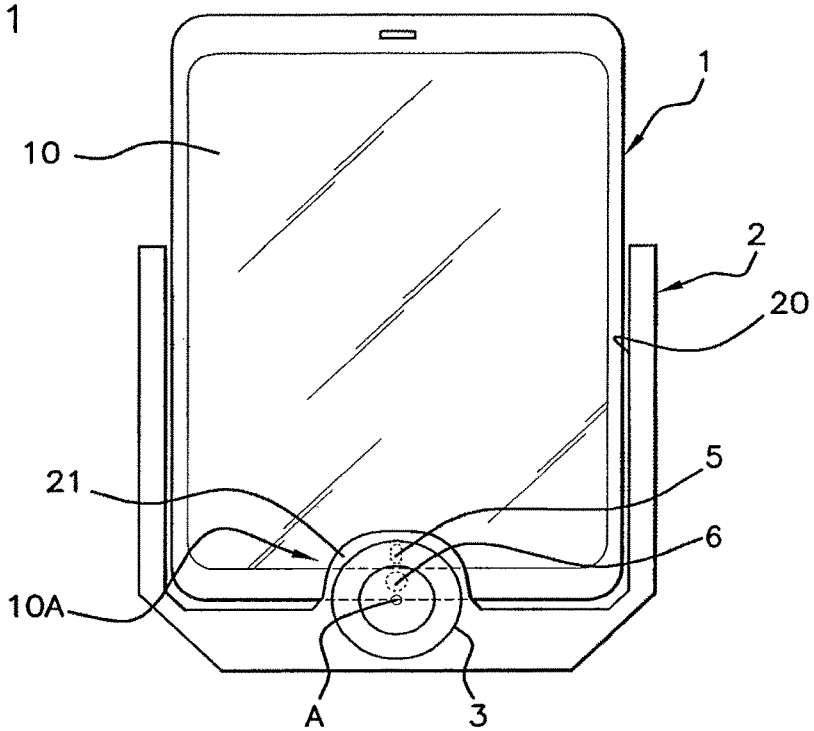
FIG. 1 shows a front view of a smartphone positioned in a carrier equipped with a control knob so as to form a system according to an aspect of the invention, according to a first embodiment.

FIG. 1 shows a front view of the system proposed according to a first embodiment. The proposed system is based on the use of an existing smartphone 1 normally used by a vehicle driver. Of course, instead of a smartphone, an electronic touchscreen tablet may also be involved, or another analogous electronic appliance. In any case, what is involved is a roaming electronic appliance equipped with a display screen 10 on what is termed the "front" face and with a camera 6 that is directed forward and that is generally complementary to a camera that is directed backward. It is the front camera 6 that will be considered more particularly hereinafter. Of course, the screen 10 may be a touchscreen, although this is not essential in the context of the present invention.

According to the principle of a roaming appliance, the driver of the vehicle takes the smartphone or the electronic tablet with him when he leaves the vehicle; when he returns to said vehicle, he reinstalls the smartphone or the electronic tablet in a carrier 2 provided for this purpose.

The carrier 2 in question may be analogous or similar to carriers that are well known in vehicles. It may comprise a base (not shown) with a suction cup system or clamp system, and jaws or a housing to hold the smartphone. According to the present invention, the carrier therefore comprises a reception zone 20 designed to receive and hold the smartphone or the electronic tablet using mechanical means that are not detailed here as they are known per se.

Furthermore, a specific zone 21 is provided in this carrier, this specific zone being equipped with a control knob 3.

The control knob 3 is mounted so as to rotate about an axis A with respect to the carrier.

The specific zone 21 at least partially covers an edge 10A of the screen of the smartphone, such that a portion of the screen is situated facing this specific zone, for reasons that will be detailed hereinafter. There is provision, in this portion of the screen 10, to provide a light source 5 in the display 10. As will be seen further on, the specific zone 21 and the control knob 3 may be configured to adjust geometrically to several types of smartphone/electronic tablet.

The light source 5 is emitted by the display screen 10 and may be a point, a line or a light bar, or even another type of source shape. The color white may preferably be chosen for the light source. The light source will preferably be arranged on the edge 10A of the display screen 10, as close as possible to the position of the camera 6.

Figure 2:
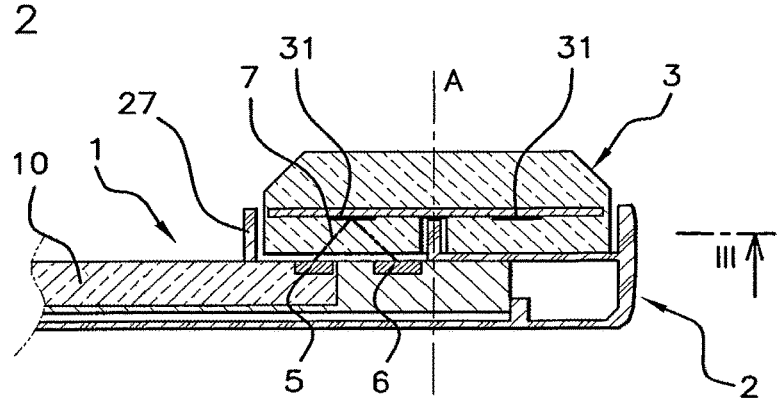
FIG. 2 shows a cross-sectional side view of the system of FIG. 1.

When the smartphone 1 is positioned in the reception zone 20 of the carrier 2 (where appropriate after geometric adjustment to the type of smartphone present), a geometric arrangement is obtained that leads to the definition, as illustrated in FIG. 2, of an optical path 7 between the light source 5 located on the display and the video camera 6, the optical path comprising a reflection off an optical reflector 31 arranged in the control knob 3.

Figure 3:
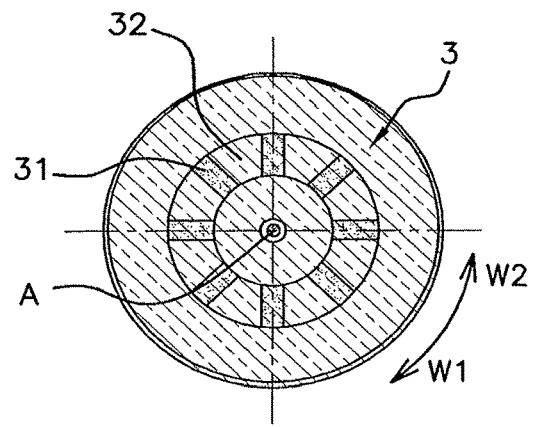
FIG. 3 is a bottom view of the control knob in the system of FIG. 1.

In this first embodiment, there are a plurality of reflective tabs on the bottom of the control knob 3, as illustrated in FIG. 3; between the reflective tabs, the inner surface of the control knob 3 is dark and non-reflective, and, as a result, an annular zone is defined that is formed of an alternating sequence of dark zones 32 and reflective tabs 31, this annular zone generally being situated on a radius of the axis at a midpoint between the distance to the axis from the light source 5 and the distance to the axis from the camera 6.

The optical path 7 is thus able to be established or interrupted selectively depending on the angular position of the control knob 3 about the axis A. More precisely, a portion of the light flux originating from the light source 5 and directed at 45° toward the outside of the screen 10 impacts the annular zone, where it may reflect by about 90° so as to be directed toward the camera 6.

As a result, when the control knob 3 is rotated about the axis A, an alternation of reception and lack of reception of the light beam at the camera 6 is produced, depending on whether or not the light beam reflects off the bottom of the control knob 3. The total lighting signal received at the camera is then of the type shown in FIG. 8.

It is noted that the control knob may rotate endlessly over more than 360°. There may be 8 reflective tabs on the annular zone, as illustrated in FIG. 3, but this number may be arbitrary; a number between 4 and 12 will preferably typically be chosen.

It is furthermore possible to detect the direction of rotation of the control knob, through relatively simple analysis of the images received at the camera. To this end, the position of a front or change is detected, that is to say it is determined whether a change arrives from the left or from the right in the sequence of images. A change or a front that arrives from the left FG is illustrated in FIG. 9A and indicates a clockwise direction of rotation W1 (cf. FIGS. 3 and 8). In an analogous manner, a change or a front that arrives from the right FD is illustrated in FIG. 9B and indicates a counter-clockwise direction of rotation W2.

Furthermore, the system proposed by the present invention comprises at least one software application for managing the emission of the light source 5 and the processing of the images received at the camera 6.

This software application, when it is active, brings about the emission of a white spot in a zone provided for this purpose, preferably facing the position of the camera 6 on the edge of the screen 10, and simultaneously analyzes the light signals received at the camera 6. The image analysis includes firstly the level of general light received at the camera 6 and secondly, in a more precise manner, the analysis of the motion of fronts as outlined above. Depending on the changes in state and on the direction of rotation that are detected, the software application deduces therefrom pips/rotational pulses in the first direction W1 or the second direction W2. Thus, by virtue of taking these pulses into account, the software application may enable a user to adjust a parameter using a cursor, or to select an element from a list of elements to select from (for example a scrolling or "pop-up" choice menu).

In addition, the software application may furthermore use a voice command, thereby enabling the user to express confirmation of the element currently selected or of the current value of a parameter (for example by saying "OK"). The operation is identical to that already described for the first mode.

Figure 4:
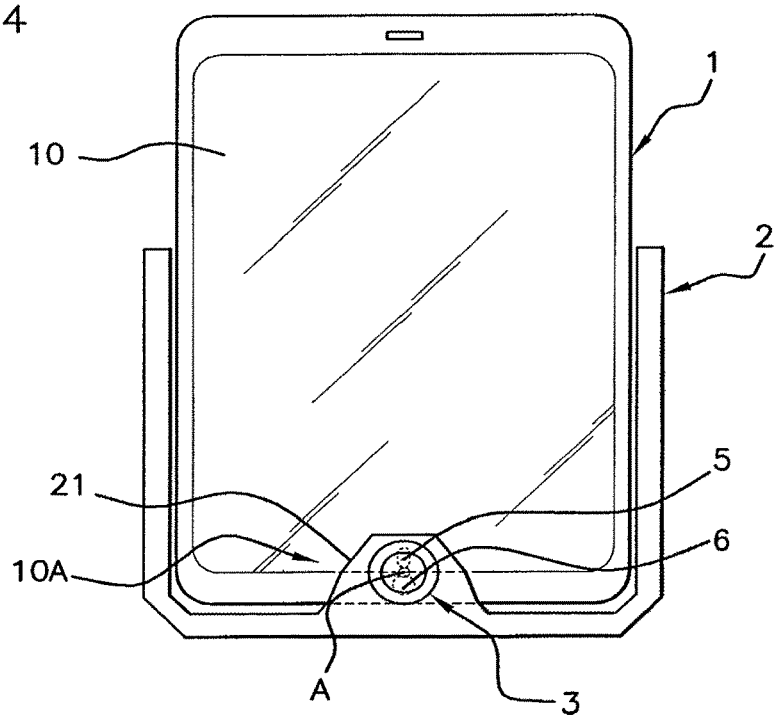
FIG. 4 is analogous to FIG. 1 for a second embodiment.
Figure 5:
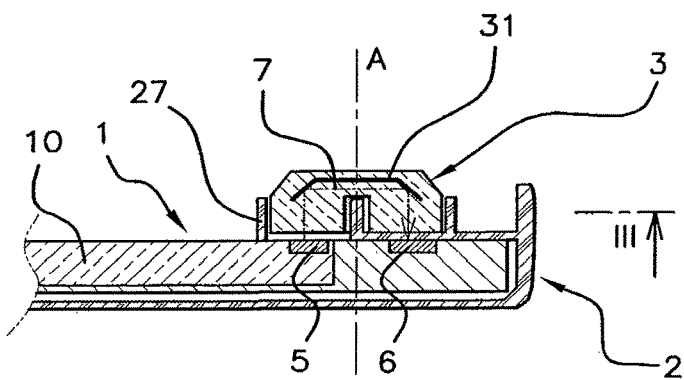
FIG. 5 shows a cross-sectional side view of the system of FIG. 4.
Figure 6:
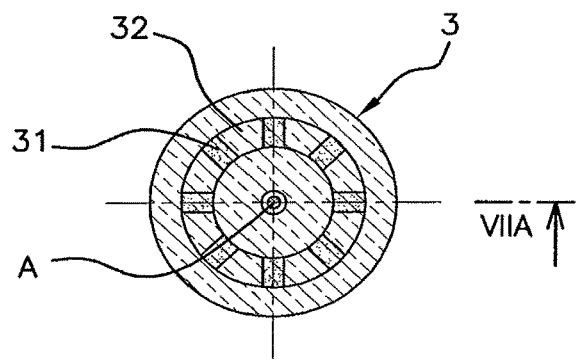
FIG. 6 is a bottom view of the control knob in the system of FIG. 4, FIGS. 7 and 7A show a third embodiment.

FIGS. 4 to 6 illustrate a second embodiment; only those elements that differ from the first mode are described hereinafter, and the other elements that are considered to be identical or similar will not be described again (in particular the smartphone, the light source, the camera and the carrier analogous to the one already described).

The control knob 3 differs in that it may be of smaller size. This result is achieved by defining an optical path 7 a portion of which passes substantially through the axis of rotation A, that is to say passes through the diameter of the control knob 3.

The outer diameter of the control knob 3 may be slightly greater than the distance separating the position of the light source 5 from the position of the camera 6.

The reflective zones are formed on a portion of a cone with an opening of 45°; the rotational swivel bearing is arranged between the optical path 7 and the surface of the screen 10.

It is noted in this case that the optical path 7 is subjected to two reflections each of around 90° between the source 5 and the camera 6, the configuration being optimal in terms of quality of emission and reception (normal to the plane of the screen).

For example, to obtain the reflective surfaces, an adhesive tape with spaced-apart reflective tabs is prepared, and then this tape is adhesively bonded to an inner frustoconical surface of the control knob 3.

FIGS. 7 and 7A illustrate a third embodiment; only those elements that differ from the first mode are described hereinafter, and the other elements that are considered to be identical or similar will not be described again (in particular the smartphone 1, the light source 5, the camera 6 and the carrier 2 analogous to the one already described).

According to this implementation, there are two optical guides 9 on a fixed transparent wall 26 of the carrier 2. A first optical guide 9 deflects the incident ray emitted by the light source by 90° in the direction of the axis A of rotation of the control knob 3. The optical path 7 then passes through an empty space in which a cylindrical cowl of the control knob 3 equipped with slots 34 moves. The optical path 7 then passes into the second optical guide 9, which deflects the light beam toward the camera 6, again by an angle close to 90°.

In these conditions, the control knob 3 may be simplified; it does not include any electronic component or any optical function unless it is that of obscuring the optical path by way of the slots 34; such a control knob 3 is extremely inexpensive.

In each mode, it is possible to provide "notches" upon rotation of the control knob 3, that is to say points of travel with a slight mechanical indexation; this forms feedback for the user rotating the control knob 3.

In each mode, it is possible to mechanically adjust the specific zone 21 for receiving the control knob 3 in such a way as to be able to adjust to several types of geometric smartphone configuration and of front camera position on the smartphone. Specifically, the front camera may be centered on the upper small side of the rectangle; it may also be positioned in an offset manner. A clip-based or slide-based adjustment system makes it possible to move the specific zone equipped with the control knob in front of the camera. A configuration application makes it possible to guide the user in this adjustment, possibly with scanning of the position of the light source. The configuration application positions the light source as close as possible to the position of the camera by default.

It is also noted that the number of reflections on the optical path is at least equal to 1 and could be greater than 2.

The invention claimed is:

1. A control knob selection system comprising:
   a smartphone or an electronic tablet comprising a front face equipped with a display and with a video camera,
   a carrier equipped with a control knob mounted so as to rotate about an axis A with respect to the carrier, and with a reception zone designed to receive and hold the smartphone or the electronic tablet, and,
   when the smartphone or the electronic tablet is positioned in the reception zone,
   an optical path between a light source emitted by the display and the video camera, with at least one reflection off an optical reflector, said optical path being able to be established or interrupted selectively depending on the angular position of the control knob about the axis A.

2. The system as claimed in claim 1, wherein the optical path is selectively interrupted by virtue of a slotted cowl in the control knob.

3. The system as claimed in claim 2, wherein the optical path is subjected to two 90° reflections, the slotted cowl being cylindrical about an axis A and interposed selectively on the path between the two reflections.

4. The system as claimed in claim 1, wherein the light source is a point or a bar on an edge zone of the display that is closest to a position of the video camera.

5. The system as claimed in claim 1, wherein the direction of rotation is detected by virtue of video analysis of images received by the video camera and of front motion detection in the images.

6. The system as claimed in claim 1, furthermore comprising a software application for generating the light source and the video processing of the images received by the video camera.

7. The system as claimed in claim 6, wherein the software application carries out an analysis of the changes of levels and frequency thereof so as to determine the direction of rotation and the magnitude/speed of rotational movement of the control knob.

8. The system as claimed in claim 1, wherein the control knob furthermore comprises notches or haptic feedback upon rotation.

9. The system as claimed in claim 1, furthermore comprising the use of a voice command for a confirmation function following selection of an element to be confirmed by the control knob.

10. The system as claimed in claim 1, wherein the light source is a point or a bar, white in color, on an edge zone of the display that is closest to a position of the video camera.

* * * * *